(12) United States Patent
Chandra et al.

(10) Patent No.: US 11,348,439 B1
(45) Date of Patent: May 31, 2022

(54) CORROSION MONITORING/ALERT SYSTEM

(71) Applicant: Dell Products L.P., Round Rock, TX (US)

(72) Inventors: Umesh Chandra, Santa Cruz, CA (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/375,181

(22) Filed: Jul. 14, 2021

(51) Int. Cl.
*G08B 21/00* (2006.01)
*G08B 21/18* (2006.01)
*G08B 19/00* (2006.01)

(52) U.S. Cl.
CPC .......... *G08B 21/182* (2013.01); *G08B 19/00* (2013.01)

(58) Field of Classification Search
CPC .............................. G08B 21/182; G08B 19/00
See application file for complete search history.

(56) References Cited

U.S. PATENT DOCUMENTS

| | | | | |
|---|---|---|---|---|
| 2016/0371957 | A1* | 12/2016 | Ghaffari | G01M 7/08 |
| 2021/0310133 | A1* | 10/2021 | Tasca | C23F 13/04 |
| 2021/0389265 | A1* | 12/2021 | Stein | G01N 27/20 |

FOREIGN PATENT DOCUMENTS

| | | | | |
|---|---|---|---|---|
| WO | WO-2021195726 A1 | * | 10/2021 | ............ C23F 13/04 |
| WO | WO-2021200499 A1 | * | 10/2021 | |
| WO | WO-2021212421 A1 | * | 10/2021 | |
| WO | WO-2021222358 A1 | * | 11/2021 | |

* cited by examiner

*Primary Examiner* — Ojiako K Nwugo
(74) *Attorney, Agent, or Firm* — Joseph Mencher

(57) ABSTRACT

A corrosion monitoring/alerting system includes a chassis. A corrosion monitoring subsystem identifies a current humidity and a current temperature in the chassis, determines that the current humidity is above a corrosion-alert humidity and the current temperature is below a corrosion-alert temperature and, in response, generates a first corrosion alert signal. A corrosion alert subsystem identifies the first corrosion alert signal and, in response, transmits a first recommended corrosion remediation action communication. The corrosion monitoring subsystem may also transmit a test current through a test computing subsystem connection, determine that a test voltage generated in response to transmitting the test current through the test computing subsystem connection is below a corrosion-alert voltage and, response, generate a second corrosion alert signal. The corrosion alert subsystem may identify the second corrosion alert signal and, in response, transmit a second recommended corrosion remediation action communication.

20 Claims, 12 Drawing Sheets

US 11,348,439 B1

CORROSION MONITORING/ALERT SYSTEM

BACKGROUND

The present disclosure relates generally to information handling systems, and more particularly to monitoring and alerting about corrosion in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices), storage systems, and/or other computing devices known in the art, are often provided in racks in datacenters that have their environment controlled in order to maintain humidity and temperature at levels that operate to prevent corrosion of computing device components and their component connections in the computing device. However, the inventors of the present disclosure have discovered that particularly wet/high humidity climates with relatively low temperatures present particular difficulties with regard to maintaining a datacenter humidity and temperature at levels that prevent the corrosion discussed above, and can introduce condensation within computing devices that results in corrosion of its computing device components and their component connections. For example, such corrosion typically occurs first in wire/cable solder connections between a connection wire/cable (e.g., a power wire/cable) and the computing device component (e.g., a fan device), and can reach a level that causes those connections to break such that the computing device component no longer operates. When such corrosion occurs, the computing device and others like it must be shut down and their computing device components replaced, which results in costs related to disrupting the datacenter and effecting its throughput, as well as replacement costs that are sometimes borne by the computing device provider in order to maintain their relationship with the computing device user.

Accordingly, it would be desirable to provide a corrosion monitoring/alert system that addresses the issues discusses above.

SUMMARY

According to one embodiment, an Information Handling System (IHS) includes a processing system; and a memory system that is coupled to the processing system and that includes instructions that, when executed by the processing system, cause the processing system to provide a corrosion monitoring engine that is configured to: identify a current humidity and a current temperature in a chassis; determine whether the current humidity is above a corrosion-alert humidity and the current temperature is below a corrosion-alert temperature; and generate, in response to determining that the current humidity is above the corrosion-alert humidity and the current temperature is below the corrosion-alert temperature, a first corrosion alert signal, wherein the memory system also includes instructions that, when executed by the processing system, cause the processing system to provide a corrosion alert engine that is configured to: identify the first corrosion alert signal generated by the corrosion monitoring engine; and transmit, in response to identifying the first corrosion alert signal, a first recommended corrosion remediation action communication.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
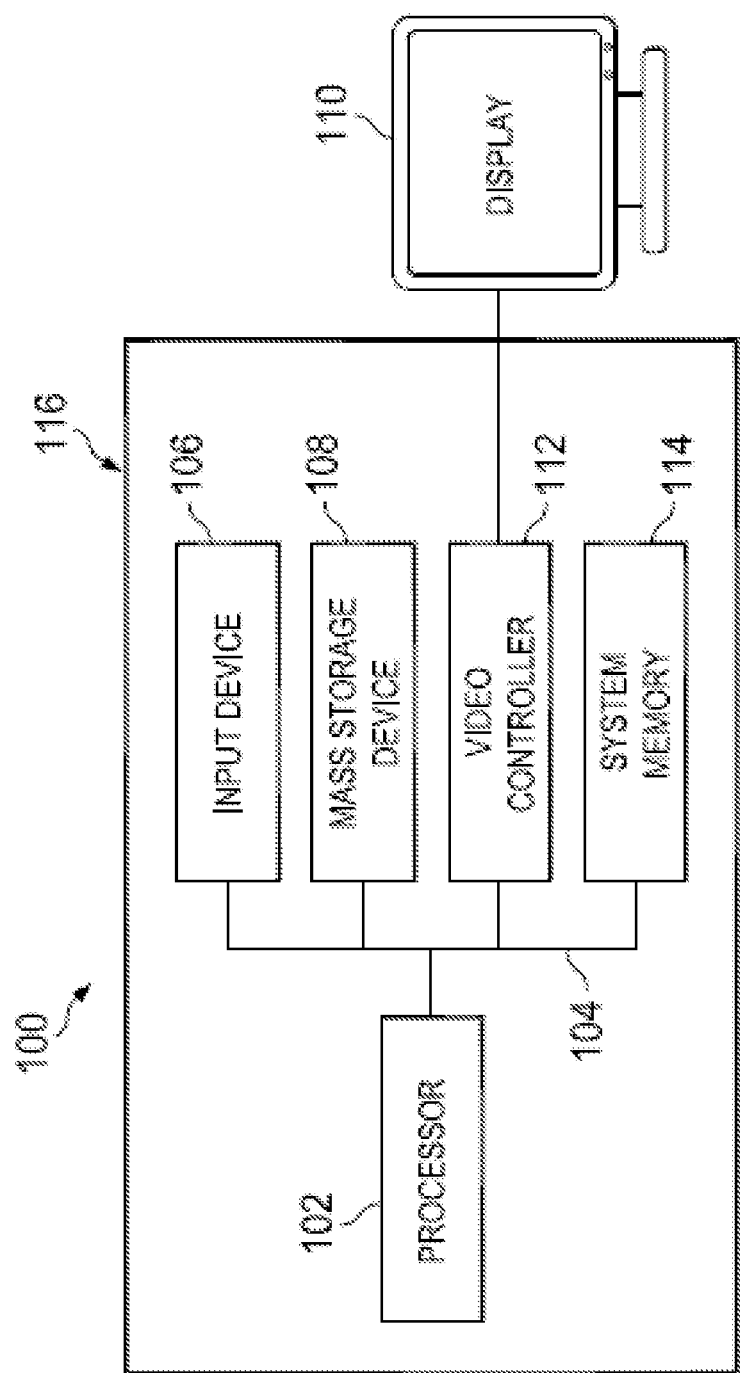
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
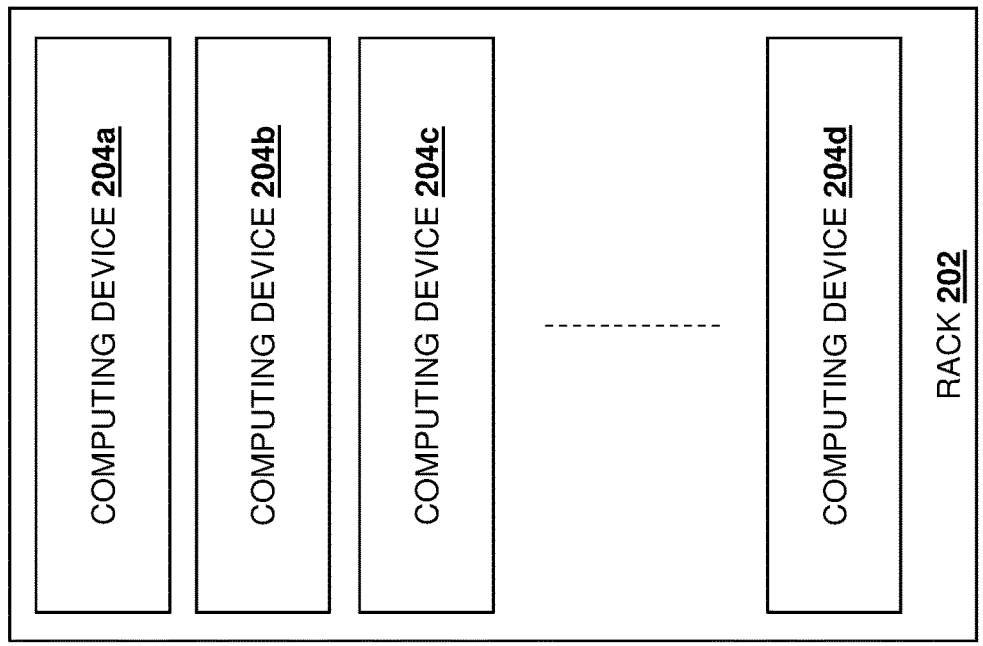
FIG. 2 is a schematic view illustrating an embodiment of a networked system that may include the corrosion monitoring/alert system of the present disclosure.

Referring now to FIG. 2, an embodiment of a networked system 200 is illustrated. In the illustrated embodiment, the networked system 200 includes rack 202 housing a plurality of computing devices 204a, 204b, 204c, and up to 204d. In an embodiment, the computing devices 204a-204d may be provided by the IHS 100 discussed above with reference to FIG. 1, and/or may include some or all of the components of the IHS 100, and in specific examples may be provided by server devices, networking devices (e.g., switch devices), storage systems, and/or any other computing devices that would be apparent to one of skill in the art in possession of the present disclosure. However, while illustrated and discussed as being provided by particular computing devices, one of skill in the art in possession of the present disclosure will recognize that computing devices provided in the networked system 200 may include any devices that may be configured to operate similarly as the computing devices. As will be appreciated by one of skill in the art in possession of the present disclosure, a datacenter may include a plurality of racks that are substantially similar to the rack 202 illustrated in FIG. 202, with each rack including computing devices substantially similar to the computing devices discussed below. However, while a specific networked system 200 has been illustrated and described, one of skill in the art in possession of the present disclosure will recognize that the corrosion monitoring/alert system of the present disclosure may include a variety of components and component configurations while remaining within the scope of the present disclosure as well.

Figure 3:
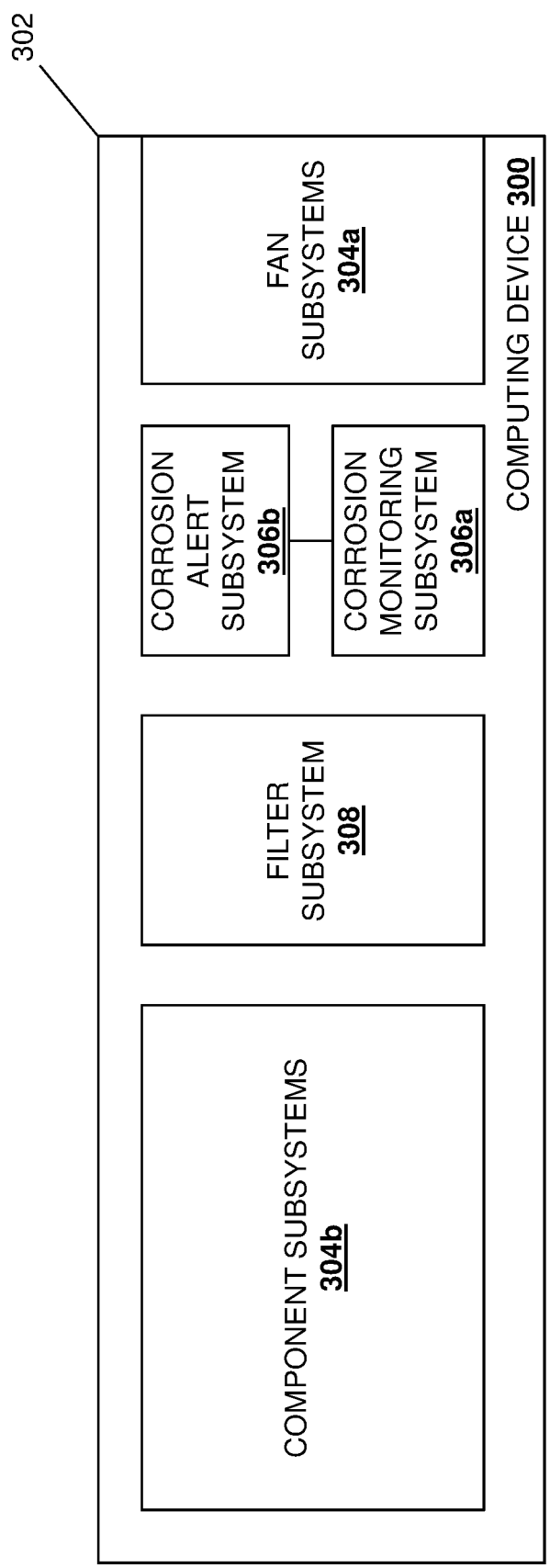
FIG. 3 is a schematic view illustrating an embodiment of a computing device that may be included in the networked system of FIG. 2 and that may utilize the corrosion monitoring/alert system of the present disclosure.

Referring now to FIG. 3, an embodiment of a computing device 300 is illustrated that may provide any of the computing devices 204a-204d discussed above with reference to FIG. 2. As such, the computing device 300 may be provided by the IHS 100 discussed above with reference to FIG. 1 and/or may include some or all of the components of the IHS 100, and in specific examples may be provided by server devices, networking devices (e.g., switch devices), storage systems, and/or any other computing devices that would be apparent to one of skill in the art in possession of the present disclosure. However, while illustrated and discussed as being provided by particular computing devices, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below.

For example, the chassis 302 may house computing subsystems that include the fan subsystem 304a and component subsystems 304b illustrated in FIG. 3, but that one of skill in the art in possession of the present disclosure will appreciate may include any of a variety of computing subsystems known in the art. As will be appreciated by one of skill in the art in possession of the present disclosure, the fan subsystems 304a may include a circuit board, fan devices, fan device connections (e.g., Surface Mount Technology (SMT) connectors on the circuit board, cabling/wiring extending between the SMT connectors and the fan devices, etc.), and/or any other fan subsystem elements that would be apparent to one of skill in the art in possession of the present disclosure. Similarly, the component subsystems 304b may include a circuit board, computing components, computing component connections (e.g., Surface Mount Technology (SMT) connectors on the circuit board, cabling/wiring extending between the SMT connectors and the computing components, etc.), and/or any other component subsystem elements that would be apparent to one of skill in the art in possession of the present disclosure.

Furthermore, the chassis 302 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a corrosion monitoring engine and a corrosion alert engine that are configured to perform the functionality of the corrosion monitoring engines/subsystems and corrosion alert engines/subsystems discussed below. In the illustrated examples, the chassis 302 houses a corrosion monitoring subsystem 306a (which may provide the corrosion monitoring engine discussed above) and a corrosion alert subsystem 306b (which may provide the corrosion alert engine discussed above) that is separate from and coupled to the corrosion monitoring subsystem 306a, but one of skill in the art in possession of the present disclosure will appreciate how the corrosion monitoring engines/subsystems and corrosion alert engines/subsystems discussed below may be provided by an integrated corrosion monitoring/alert engine/subsystem while remaining within the scope of the present disclosure as well.

The chassis 302 may also house a filter subsystem 308 that may be provided by a desiccant filter and/or other filters that one of skill in the art in possession of the present disclosure would recognize as being configured to remove both particulates and moisture from an airflow. As will be appreciated by one of skill in the art in possession of the present disclosure, the fan subsystems 304a may push and/or pull air through the chassis 302 to generate an airflow that is filtered by the filter subsystems 308 before that airflow moves past the component subsystems 304b in order to cool those component subsystems 304b during their operation. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
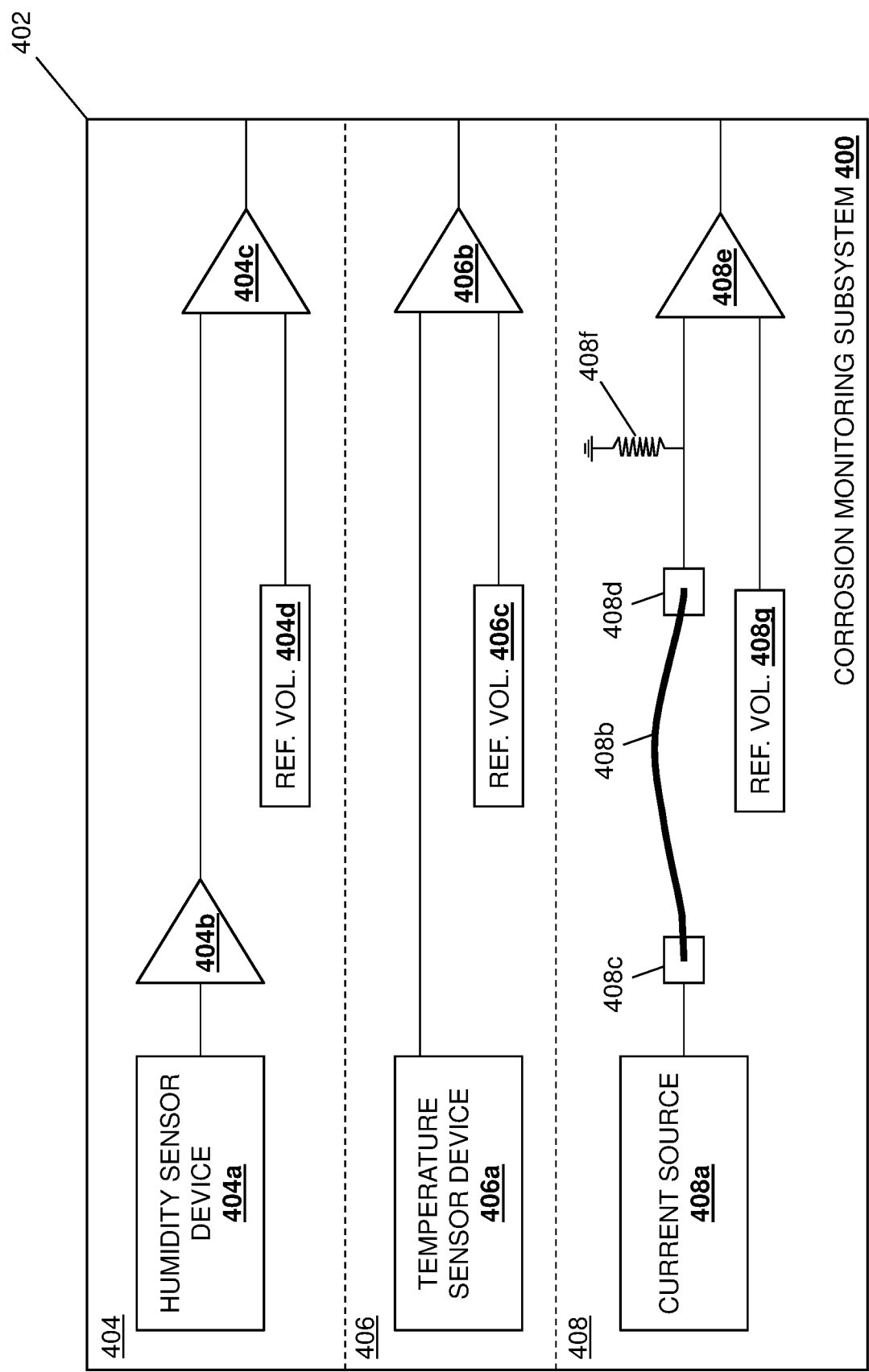
FIG. 4 is a schematic view illustrating an embodiment of a corrosion monitoring subsystem that may be included in the computing device of FIG. 2 and that may be part of the corrosion monitoring/alert system of the present disclosure.

Referring now to FIG. 4, an embodiment of a corrosion monitoring subsystem 400 is illustrated that may provide the corrosion monitoring subsystem 306a discussed above with reference to FIG. 3. In the illustrated embodiment, the corrosion monitoring subsystem 400 includes a humidity monitoring subsystem 404 that includes a humidity sensor device 404a that provides an input to a frequency-to-voltage converter 404b, with a comparator 404c receiving inputs from an output of the frequency-to-voltage converter 404b and from a reference voltage ("REF. VOL.") 404d, and providing an output to the corrosion alert subsystem 306b. As discussed below, the humidity sensor device 404a may be configured to generate an output pulse with a frequency that is proportional to a current humidity percentage sensed by the humidity sensor device 404a, and the frequency-to-voltage converter 404b may be configured to convert that pulse frequency to a Direct Current (DC) voltage that is proportional to the pulse frequency (and thus the current humidity percentage), and output that voltage to the comparator 404c. The comparator 404c may then compare the voltage output by the frequency-to-voltage converter 404b to the reference voltage 404d that may be provided by a DC voltage that corresponds to a humidity of 90%, and output a "0" when the DC voltage output by the frequency-to-voltage converter 404b is less than the reference voltage 404d (i.e., when the current humidity is less than 90%), while outputting a "1" when the DC voltage output by the frequency-to-voltage converter 404b is greater than or equal to the reference voltage 404d (i.e., when the current humidity is greater than or equal to 90%).

In the illustrated embodiment, the corrosion monitoring subsystem 400 also includes a temperature monitoring subsystem 406 that includes a temperature sensor device 406a that provides an input to a comparator 406b, with the comparator 406c also receiving an input from a reference voltage ("REF. VOL.") 406c, and providing an output to the corrosion alert subsystem 306b. As discussed below, the temperature sensor device 406a may be configured to generate a DC voltage that is proportional to a current temperature sensed by the temperature sensor device 406a and that is output to the comparator 406b. The comparator 406b may then compare the voltage output by the temperature sensor device 406a to the reference voltage 406c that may be provided by a DC voltage that corresponds to a temperature of 55 degrees Celsius, and output a "0" when the DC voltage output by the temperature sensor device 406a is less than or equal to the reference voltage 406c (i.e., when the current temperature is less than or equal to 55 degrees Celsius), while outputting a "1" when the DC voltage output by the temperature sensor device 406a is greater than the reference voltage 406c (i.e., when the current temperature is greater than 55 degrees Celsius).

In the illustrated embodiment, the corrosion monitoring subsystem 400 also includes a connection corrosion test subsystem 408 that includes a current source 408a that provides a test current through a test wire/cable 408b that is connected to a pair of connectors 408c and 408d (e.g., which may be provided by SMT connectors on a circuit board), with the connector 408c connected to the current source 408a and the connector 408d connected to a comparator 408e. A resistor 408f is connected between the connector 408d and the comparator 408e, as well as to ground. The comparator 408e receives inputs from the connector 408d as well as from a reference voltage ("REF. VOL.") 408g, and provides an output to the corrosion alert subsystem 306b. As will be appreciated by one of skill in the art in possession of the present disclosure, the test wire/cable 408b that is connected to the connectors 408c and 408d may be provided such that it is substantially similar to computing subsystem connections that are mostly likely to be affected by corrosion first (e.g., wire/cable connections to fan devices in specific examples discussed below), and thus the connection/test wire/cable interface may be the same as that of the computing subsystem connections that are mostly likely to be affected by corrosion first, the test wire/cable characteristics may be the same as that of the computing subsystem connections that are mostly likely to be affected by corrosion first, etc.

As discussed below, the current source 408a provides a current to the test wire/cable 408b via the connector 408c, and the connection of the connector 408d, the resistor 408f, and the comparator 408e will cause a voltage to develop across the resistor 408f and be input at the comparator 408e when the test wire/cable 408b and/or its connections to the connectors 408c and 408d are not corroded to an extent (e.g., broken) that would prevent that voltage from reaching the comparator 408e. In a specific example, the reference voltage 408g may be configured to be slightly less than the voltage developed by the resistor 408f and the current provided by the current source 408a when the test wire/cable 408b and/or its connections to the connectors 408c and 408d are not corroded. As such, when at least one of the test wire/cable 408b and/or its connections to the connectors 408c and 408d is broken, 0 volts will be seen at the input to the comparator 408e (e.g., due to no current flow through the resistor 408f). Furthermore, when the test wire/cable 408b and/or its connections to the connectors 408c and 408d are corroded, some voltage below the reference voltage will be seen at the input to the comparator 408e (e.g., due to the corrosion resulting in less current flow through the resistor 408f relative to a no-corrosion situation).

The comparator 408e may compare the voltage input via the connector 408d/resistor 408f combination to the reference voltage 408g and output a "0" when the voltage output from the connector 408d/resistor 408f combination is less than the reference voltage 408g (i.e., when the test wire/cable 408b and/or its connections to the connectors 408c and 408d are corroded or broken), while outputting a "1" when the voltage output from the connector 408d/resistor 408f combination greater than or equal to the reference voltage 406c (i.e., the test wire/cable 408b and its connections to the connectors 408c and 408d are not corroded or broken). However, while a specific humidity monitoring subsystem 404, temperature monitoring subsystem 406, and connection corrosion test subsystem 408 have been illustrated and described, one of skill in the art in possession of the present disclosure will recognize that other techniques for monitoring humidity, temperature, and corrosion of a test computing subsystem and/or computing subsystem connection may be utilized while remaining within the scope of the present disclosure as well.

Figure 5A:
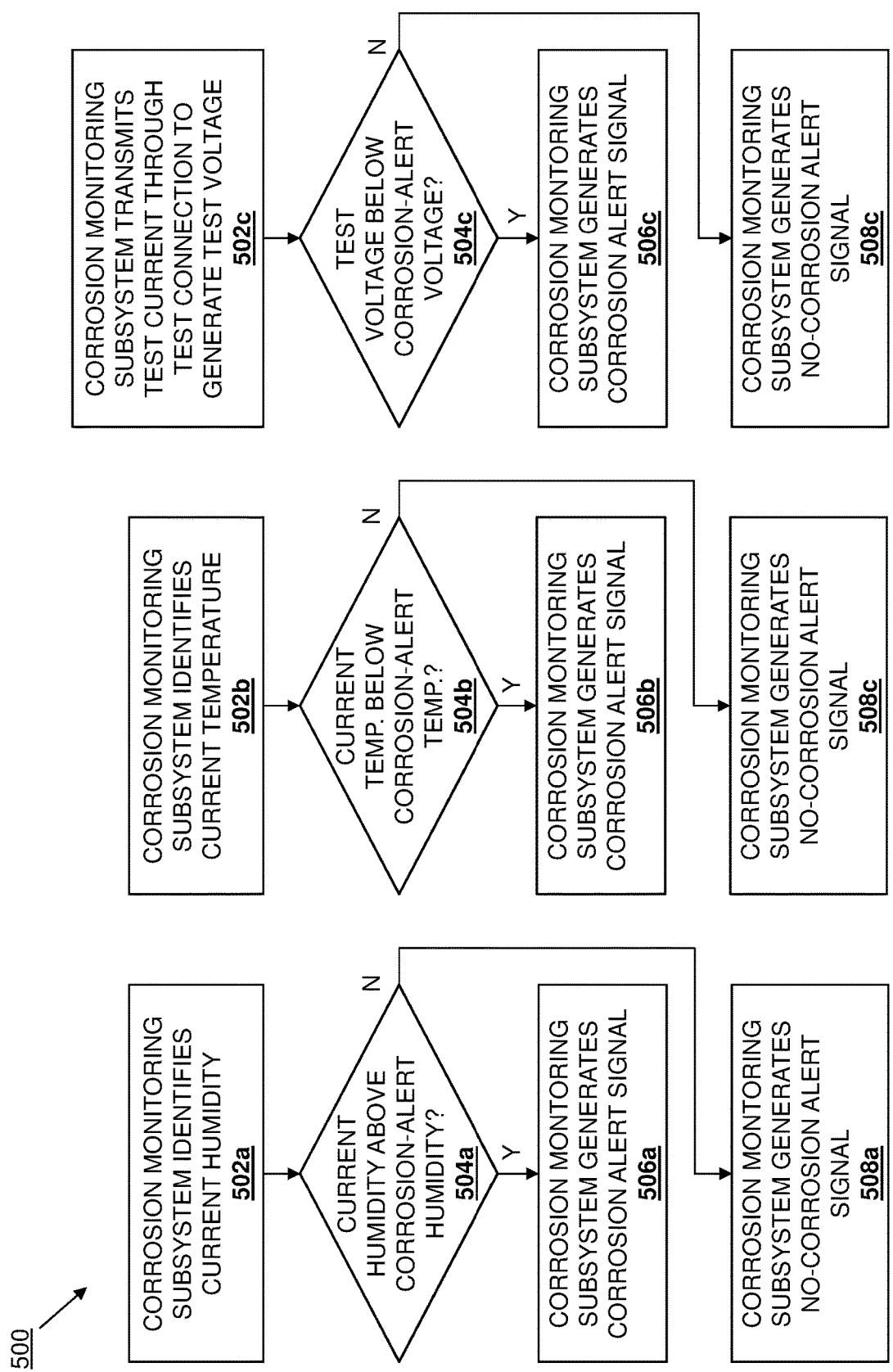
FIG. 5A is a flow chart illustrating an embodiment of a portion of a method for monitoring and alerting about corrosion in a computing device.
Figure 5B:
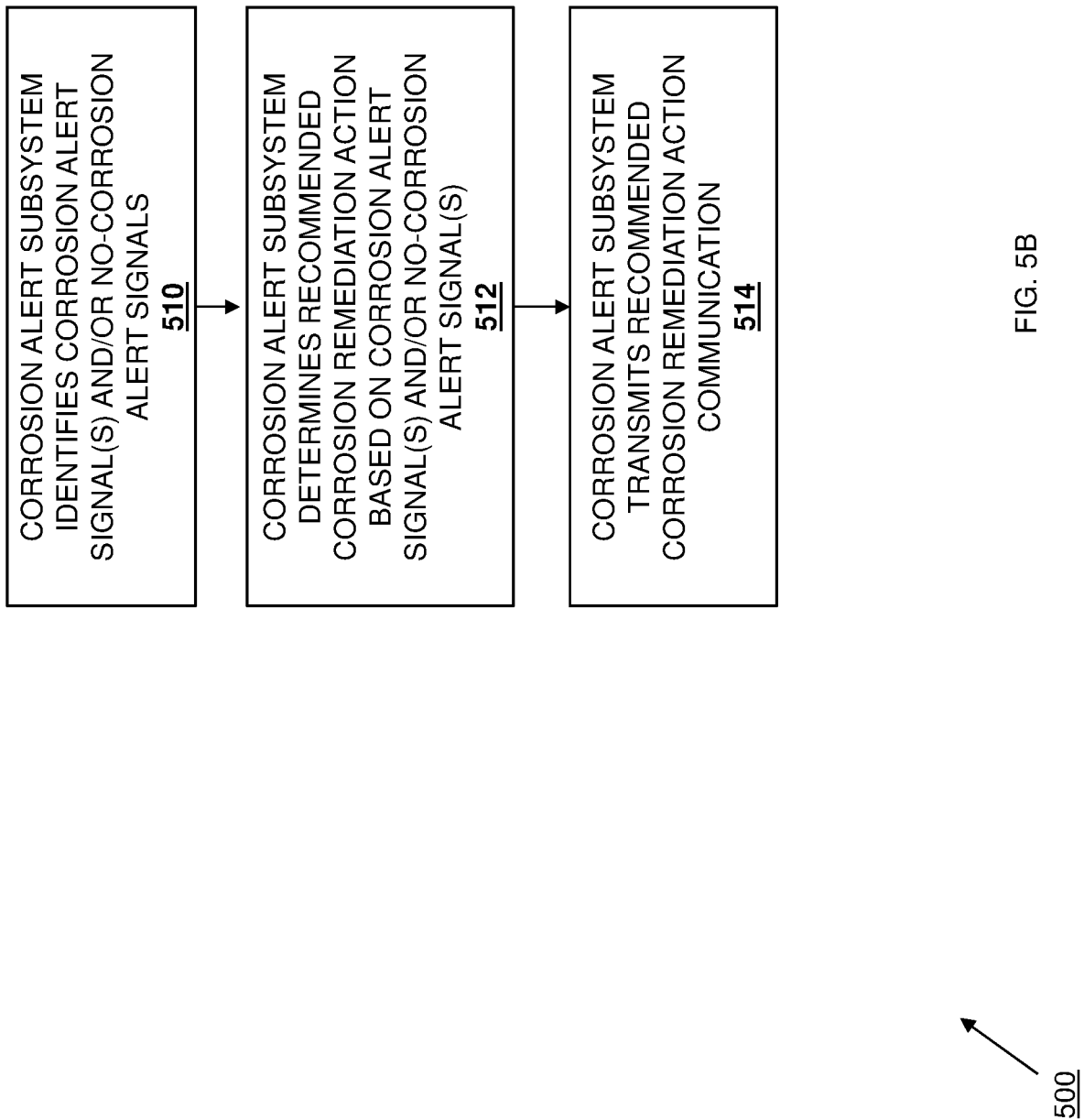
FIG. 5B is a flow chart illustrating an embodiment of a portion of the method of FIG. 5A for monitoring and alerting about corrosion in a computing device.

Referring now to FIGS. 5A and 5B, an embodiment of a method 500 for monitoring and alerting about corrosion in a computing device is illustrated. As discussed below, the systems and methods of the present disclosure provide for the monitoring for a corrosion environment in a computing device by monitoring for relatively high humidity and relatively low temperature, as well as monitoring for actual corrosion in a computing device by monitoring a test connection, which allows alerts to be generated and transmitted when the corrosion environment or actual corrosion exists. For example, the corrosion monitoring/alerting system of the present disclosure may include a chassis. A corrosion monitoring subsystem identifies a current humidity and a current temperature in the chassis, determines that the current humidity is above a corrosion-alert humidity and the current temperature is below a corrosion-alert temperature and, in response, generates a first corrosion alert signal. A corrosion alert subsystem identifies the first corrosion alert signal and, in response, transmits a first recommended corrosion remediation action communication. The corrosion monitoring subsystem may also transmit a test current through a test computing subsystem connection, determine that a test voltage generated in response to transmitting the test current through the test computing subsystem connection is below a corrosion-alert voltage and, response, generate a second corrosion alert signal. The corrosion alert subsystem may identify the second corrosion alert signal and, in response, transmit a second recommended corrosion remediation action communication. As such, corrosion environments and actual corrosion may be addressed prior to them negatively impacting the operations of the computing device.

Figure 6A:
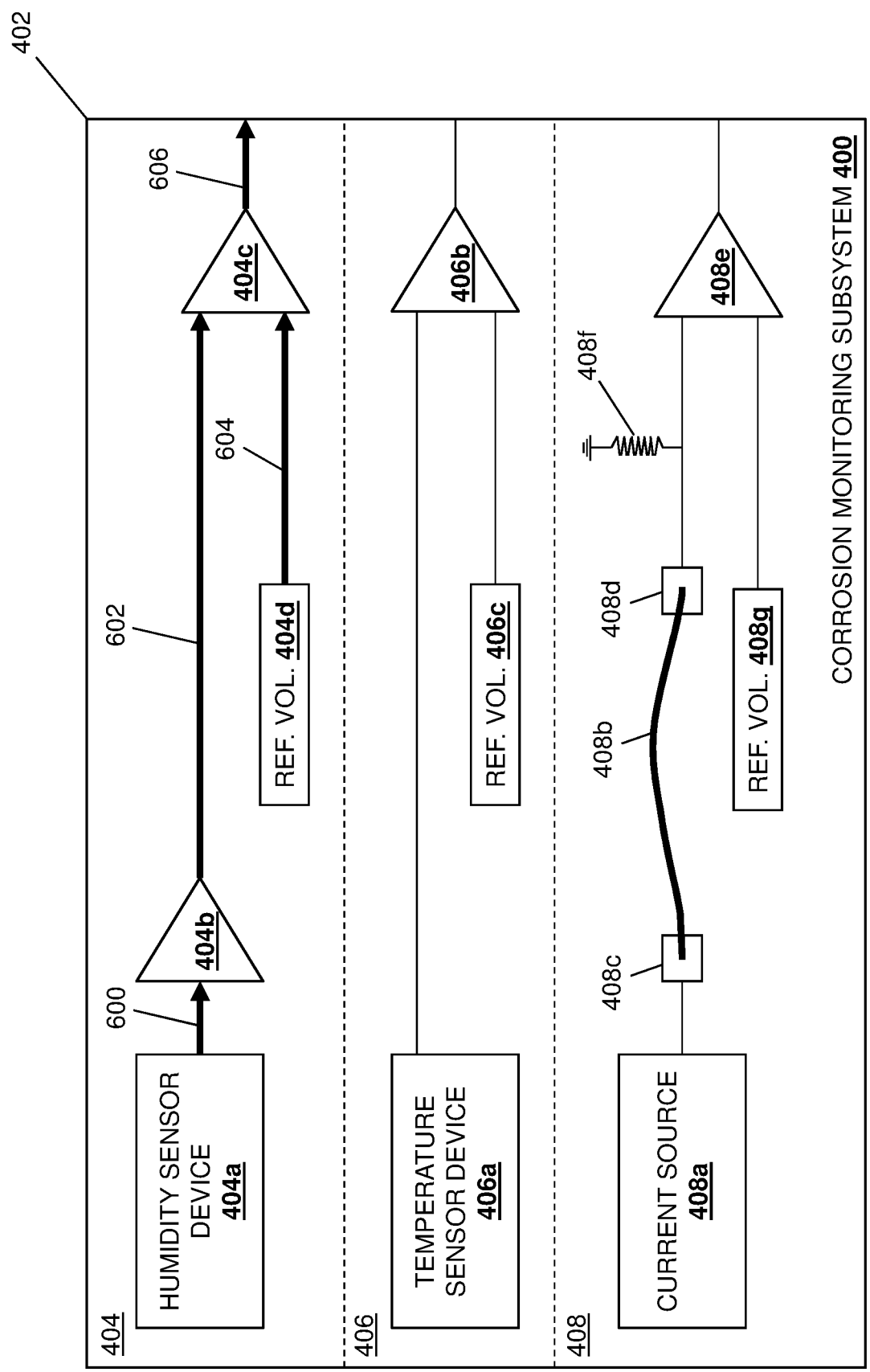
FIG. 6A is a schematic view illustrating an embodiment of the corrosion monitoring subsystem of FIG. 4 operating during the method of FIG. 5.

The method 500 may begin (or may be performed concurrently with or subsequent to method blocks 502b-508b and/or 502c-508c) at block 502a where a corrosion monitoring subsystem identifies a current humidity. As will be appreciated by one of skill in the art in possession of the present disclosure, the humidity monitoring operations described below with reference to method blocks 502a-508a may be performed by the corrosion monitoring subsystem 306a/400 prior to, at the same time as, or subsequent to the temperature monitoring operations described below with reference to method blocks 502b-508b and/or the test connection corrosion monitoring operations described below with reference to method blocks 502c-508c. With reference to FIG. 6A, in an embodiment of block 502a, the humidity sensor device 404a in the corrosion monitoring subsystem 306a/400 may be configured to detect a current humidity percentage in the chassis 302 and, in response, generate an output pulse with a frequency that is proportional to the current humidity percentage, and perform pulse transmission operations 600 that include transmitting that pulse to the frequency-to-voltage converter 404b in the corrosion monitoring subsystem 306a/400.

The method 500 then proceeds to decision block 504a where it is determined whether the current humidity is above a corrosion-alert humidity. With continued reference to FIG. 6A, in an embodiment of decision block 504a, the frequency-to-voltage converter 404b may convert the pulse frequency received from the humidity sensor device 404a as part of the pulse transmission operations 600 to a DC voltage that is proportional to the pulse frequency (and thus the current humidity percentage detected by the humidity sensor device 404a), and then perform voltage transmission operations 602 to transmit that voltage to the comparator 404c. Furthermore, the reference voltage 404d may be transmitted to the comparator 404c as part of reference voltage transmission operations 604, and the comparator 404c may compare the voltage received from the frequency-to-voltage converter 404b as part of the voltage transmission operations 602 to the reference voltage 404d that is received as part of the reference voltage transmission operations 604. As discussed above, the reference voltage may correspond to a corrosion-alert humidity level of 90%, and thus at decision block 504a the comparator 404c may operate to determine whether the voltage received from the frequency-to-voltage converter 404b as part of the voltage transmission operations 602 is above or below the reference voltage/corrosion-alert humidity level of 90%.

If, at decision block 504a, it is determined that the current humidity is above the corrosion-alert humidity, the method 500 proceeds to block 506a where the corrosion monitoring subsystem generates a corrosion alert signal. With continued reference to FIG. 6A, in an embodiment of decision block 504a the comparator 404c may determine that the voltage received from the frequency-to-voltage converter 404b as part of the voltage transmission operations 602 is greater than or equal to the reference voltage 404d (which corresponds to a corrosion-alert humidity level of 90% in this example) and, in response, at block 506a may perform corrosion/no-corrosion alert signal transmission operations 606 that include outputting a "1" that, as discussed above, identifies that the current humidity in the chassis 302 is greater than or equal to 90%.

If, at decision block 504a, it is determined that the current humidity is below the corrosion-alert humidity, the method 500 proceeds to block 508a where the corrosion monitoring subsystem generates a no-corrosion alert signal. With continued reference to FIG. 6A, in an embodiment of decision block 504a the comparator 404c may determine that the voltage received from the frequency-to-voltage converter 404b as part of the voltage transmission operations 602 is less than the reference voltage (which corresponds to a corrosion-alert humidity level of 90% in this example) and, in response, at block 508a may perform the corrosion/no-corrosion alert signal transmission operations 606 that include outputting a "0" that, as discussed above, identifies that the current humidity is less than or equal to 90%. As such, the humidity monitoring subsystem 404 in the corrosion monitoring subsystem 400 will operate according to method blocks 502a-508a to transmit no-corrosion alert signals whenever the current humidity in the chassis 302 is less than a corrosion alert humidity (e.g., 90% humidity in this example, but which may be set at other humidity levels while remaining within the scope of the present disclosure), and then transmit corrosion alert signals whenever the current humidity in the chassis 302 is greater than or equal to the corrosion alert humidity (e.g., 90% humidity in this example, but which may be set at other humidity levels while remaining within the scope of the present disclosure).

Figure 7A:
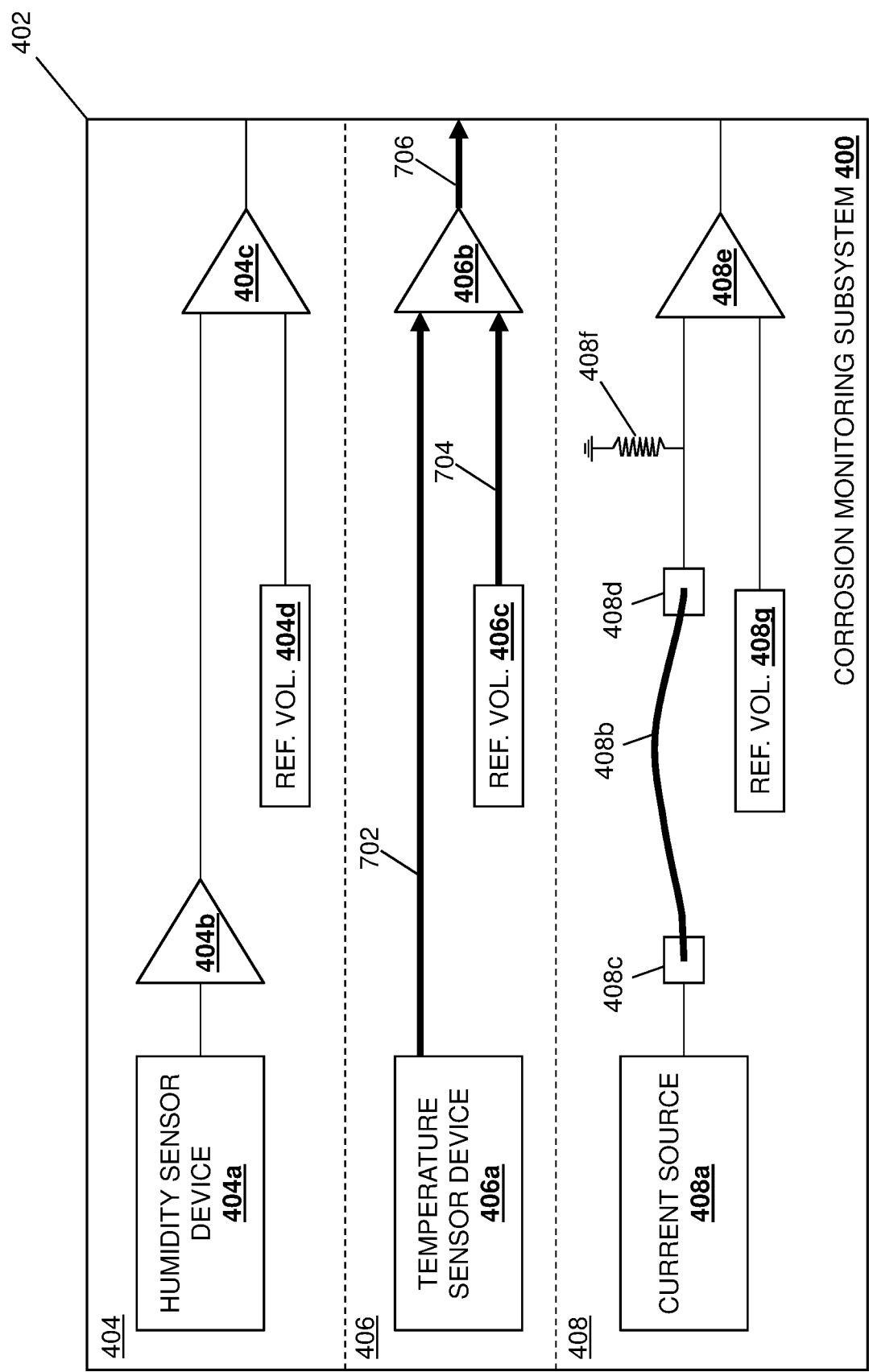
FIG. 7A is a schematic view illustrating an embodiment of the corrosion monitoring subsystem of FIG. 4 operating during the method of FIG. 5.

The method 500 may also begin (or be performed concurrently with method blocks 502a-508a and/or 502c-508c) at block 502b where a corrosion monitoring subsystem identifies a current temperature. As will be appreciated by one of skill in the art in possession of the present disclosure, the temperature monitoring operations described below with reference to method blocks 502b-508b may be performed by the corrosion monitoring subsystem 306a/400 prior to, at the same time as, or subsequent to the humidity monitoring operations described above with reference to method blocks 502a-508a and/or the test connection corrosion monitoring operations described below with reference to method blocks 502c-508c. With reference to FIG. 7A, in an embodiment of block 502b, the temperature sensor device 406a in the corrosion monitoring subsystem 306a/400 may be configured to detect a current temperature in the chassis 302 and, in response, generate a voltage that is proportional to the current temperature and perform voltage transmission operations 702 to transmit that voltage to the comparator 406b.

The method 500 then proceeds to decision block 504b where it is determined whether the current temperature is below a corrosion-alert temperature. With continued reference to FIG. 7A, in an embodiment of decision block 504b, the reference voltage 406c may be transmitted to the comparator 406b as part of reference voltage transmission operations 704, and the comparator 406b may compare the voltage received from the temperature sensor device 406a as part of the voltage transmission operations 702 to the reference voltage 406c that is received as part of the reference voltage transmission operations 704. As discussed above, the reference voltage may correspond to a temperature of 55 degrees Celsius, and thus at decision block 504b the comparator 406b may operate to determine whether the voltage received from the temperature sensor device 406a as part of the voltage transmission operations 702 is above or below the reference voltage/corrosion-alert temperature level of 55 degrees Celsius.

If, at decision block 504b, it is determined that the current temperature is below the corrosion-alert temperature, the method 500 proceeds to block 506b where the corrosion monitoring subsystem generates a corrosion alert signal. With continued reference to FIG. 7A, in an embodiment of decision block 504b the comparator 406b may determine that the voltage received from the temperature sensor device 406a as part of the voltage transmission operations 702 is less than or equal to the reference voltage (which corresponds to a corrosion-alert temperature level of 55 degrees Celsius in this example) and, in response, at block 506b may perform corrosion/no-corrosion alert signal transmission operations 706 that include outputting a "0" that, as discussed above, identifies that the current temperature in the chassis 302 is less than or equal to 55 degrees Celsius.

If, at decision block 504b, it is determined that the current temperature is above the corrosion-alert temperature, the method 500 proceeds to block 508b where the corrosion monitoring subsystem generates a no-corrosion alert signal. With continued reference to FIG. 7A, in an embodiment of decision block 504b the comparator 406b may determine that the voltage received from the temperature sensor device 406a as part of the voltage transmission operations 702 is greater than the reference voltage (which corresponds to a corrosion-alert temperature level of 55 degrees Celsius in this example) and, in response, at block 508b may perform the corrosion/no-corrosion alert signal transmission operations 706 that include outputting a "1" that, as discussed above, identifies that the current temperature is greater than 55 degrees Celsius). As such, the temperature monitoring subsystem 406 in the corrosion monitoring subsystem 400 will operate according to method blocks 502b-508b to transmit no-corrosion alert signals whenever the current temperature in the chassis 302 is greater than a corrosion alert temperature (e.g., 55 degrees Celsius in this example, but which may be set at other temperature levels while remaining within the scope of the present disclosure), and then transmit corrosion alert signals whenever the current temperature in the chassis 302 is less than or equal to the corrosion alert temperature (e.g., 55 degrees Celsius in this example, but which may be set at other temperature levels while remaining within the scope of the present disclosure).

Figure 8A:
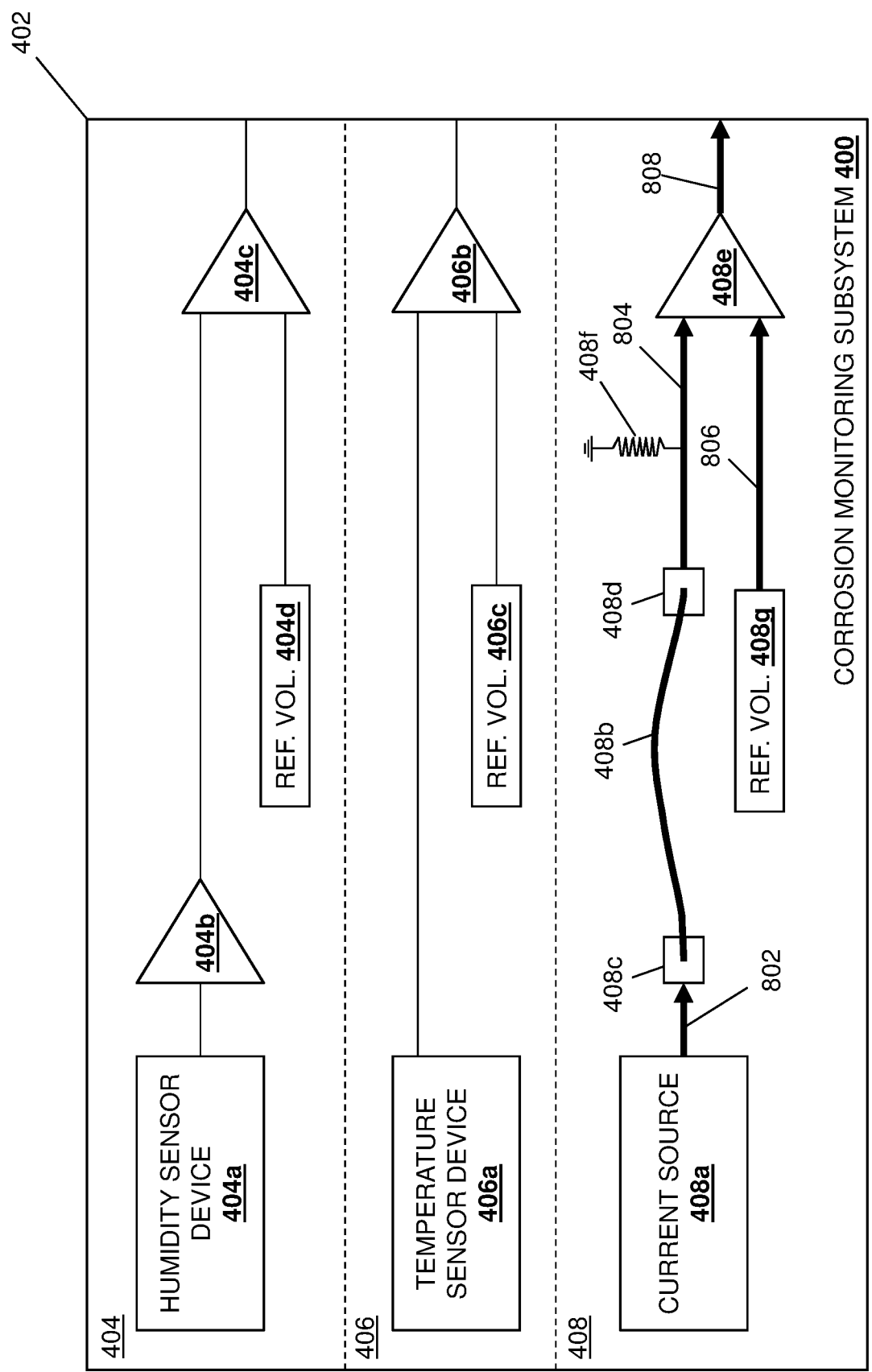
FIG. 8A is a schematic view illustrating an embodiment of the corrosion monitoring subsystem of FIG. 4 operating during the method of FIG. 5.

The method 500 may also begin (or be performed concurrently with method blocks 502a-508a and/or 502b-508b) at block 502c where a corrosion monitoring subsystem transmits a test current through a test connection to generate a test voltage. As will be appreciated by one of skill in the art in possession of the present disclosure, the test connection corrosion monitoring operations described below with reference to method blocks 502c-508c may be performed by the corrosion monitoring subsystem 306a/400 prior to, at the same time as, or subsequent to the humidity monitoring operations described above with reference to method blocks 502a-508a and/or the temperature monitoring operations described above with reference to method blocks 502b-508b. With reference to FIG. 8A, in an embodiment of block 502c, the current source 408a in the corrosion monitoring subsystem 306a/400 may be configured to perform current transmission operations 802 to transmit a current to the test wire/cable 408b via the connector 408c, while the connection of the connector 408d and the resistor 408f will cause a voltage to develop across the resistor 408f when the test wire/cable 408b and/or connectors 408c and 408d are not completely corroded such that they are broken, and in turn cause voltage transmission operations 804 that result in a voltage being input at the comparator 408e (i.e., when the test wire/cable 408b and its connections to the connectors 408c and 408d are not completely corroded such that they are broken).

The method 500 then proceeds to decision block 504c where it is determined whether the test voltage is below a corrosion-alert voltage. With continued reference to FIG. 8A, in an embodiment of decision block 504c, the reference voltage 408g may be transmitted to the comparator 408e as part of reference voltage transmission operations 806, and the comparator 408e may compare any voltage received via the connection to the connector 408d and the resistor 408f as part of the voltage transmission operations 804 to the reference voltage 408g that is received as part of the reference voltage transmission operations 806. As discussed above, the reference voltage may correspond to a voltage that is slightly less than is expected when the test wire/cable 408b and its connections to the connectors 408c and 408d are not corroded, and thus at decision block 504c the comparator 408e may operate to determine whether any voltage received via the connection of the connector 408d and the resistor 408f as part of the voltage transmission operations 804 is above or below the reference voltage/corrosion-alert voltage level that is slightly less than is expected when the test wire/cable 408b and its connections to the connectors 408c and 408d are not corroded.

If, at decision block 504c, it is determined that the test voltage is below the corrosion-alert voltage, the method 500 proceeds to block 506c where the corrosion monitoring subsystem generates a corrosion alert signal. With continued reference to FIG. 8A, in an embodiment of decision block 504c the comparator 408e may determine that the voltage received via the connection of the connector 408d and the resistor 408f as part of the voltage transmission operations 804 is less than the reference voltage (which corresponds to a voltage that is slightly less than is expected when the test wire/cable 408b and its connections to the connectors 408c and 408d are not corroded in this example) and, in response, at block 506c may perform corrosion/no-corrosion alert signal transmission operations 808 that include outputting a "0" that, as discussed above, identifies that the test wire/cable 408b and/or its connections to the connectors 408c and 408d are corroded or broken.

If, at decision block 504c, it is determined that the test voltage is above the corrosion-alert voltage, the method 500 proceeds to block 508c where the corrosion monitoring subsystem generates a no-corrosion alert signal. With continued reference to FIG. 8A, in an embodiment of decision block 504c the comparator 408e may determine that the voltage received via the connection of the connector 408d and the resistor 408f as part of the voltage transmission operations 804 is greater than or equal to the reference voltage (which corresponds to a voltage that is slightly less than is expected when the test wire/cable 408b and its connections to the connectors 408c and 408d are not corroded in this example) and, in response, at block 508c may perform the corrosion/no-corrosion alert signal transmission operations 808 that include outputting a "1" that, as discussed above, identifies that the test wire/cable 408b and/or its connections to the connectors 408c and 408d are not corroded or broken. As such, the connection corrosion test subsystem 408 in the corrosion monitoring subsystem 400 will operate according to method blocks 502c-508c to transmit no-corrosion alert signals whenever the test wire/cable 408b and its connections to the connectors 408c and 408d are not corroded or broken, and then transmit corrosion alert signals whenever the test wire/cable 408b and its connections to the connectors 408c and 408d are experiencing at least some level of corrosion.

Figure 6B:
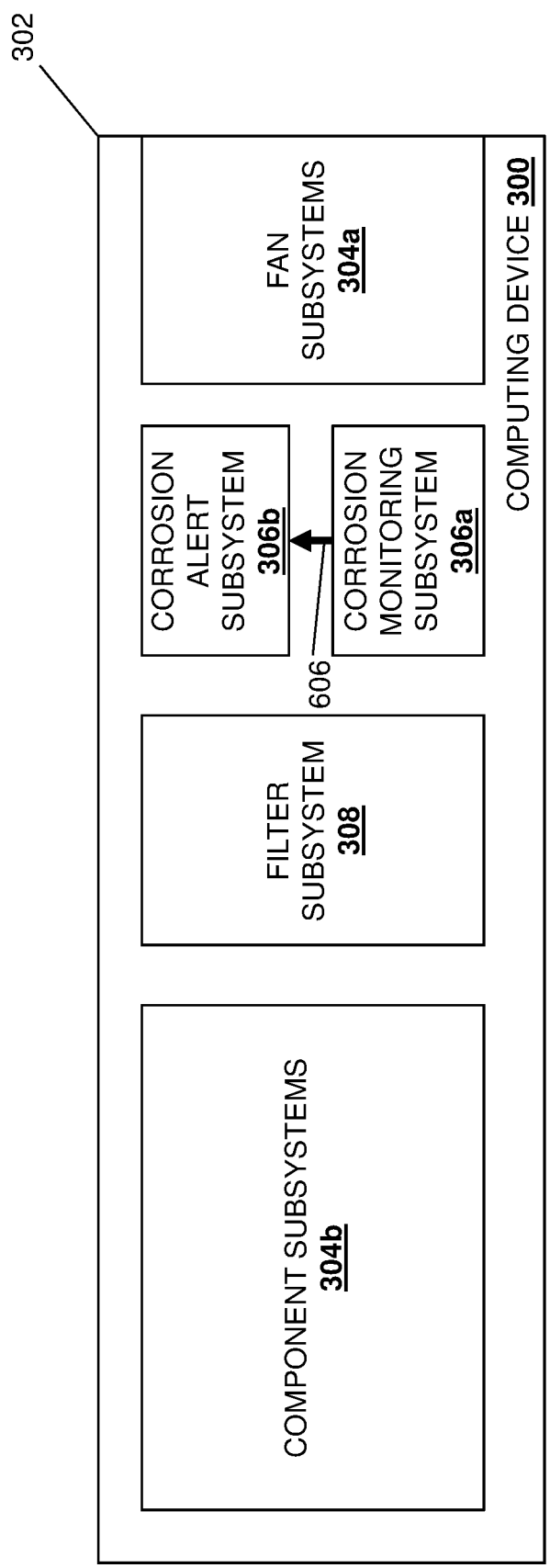
FIG. 6B is a schematic view illustrating an embodiment of the computing device of FIG. 3 operating during the method of FIG. 5.
Figure 7B:
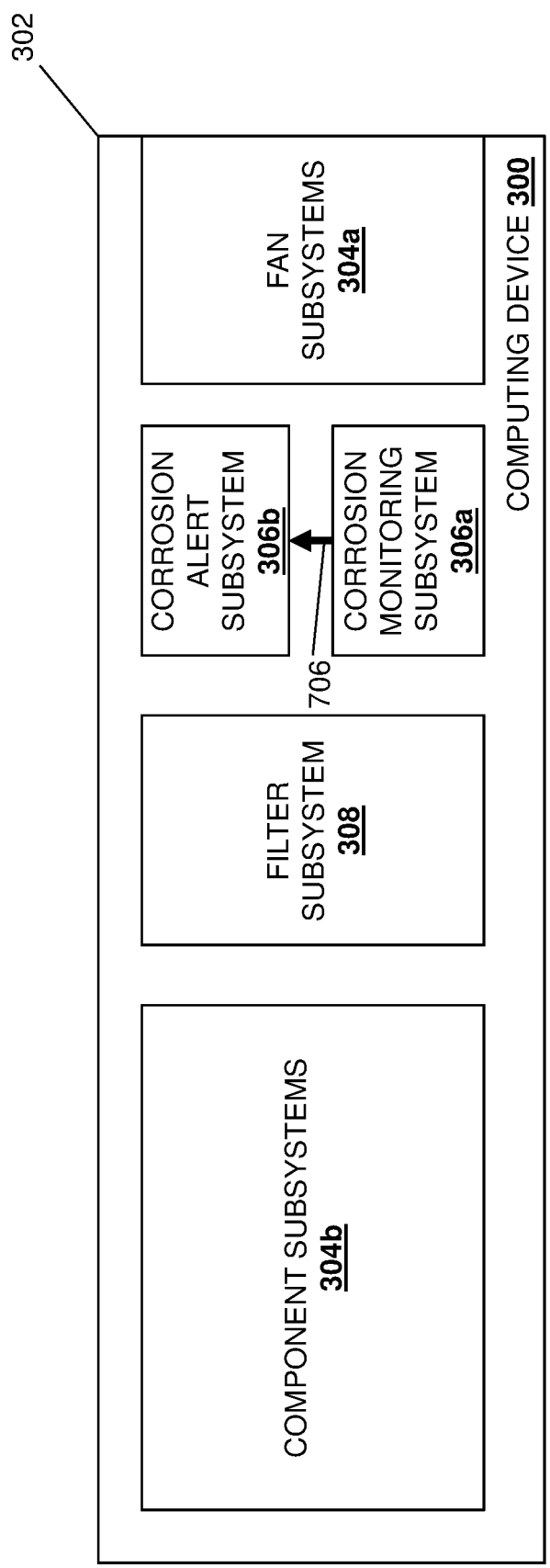
FIG. 7B is a schematic view illustrating an embodiment of the computing device of FIG. 3 operating during the method of FIG. 5.
Figure 8B:
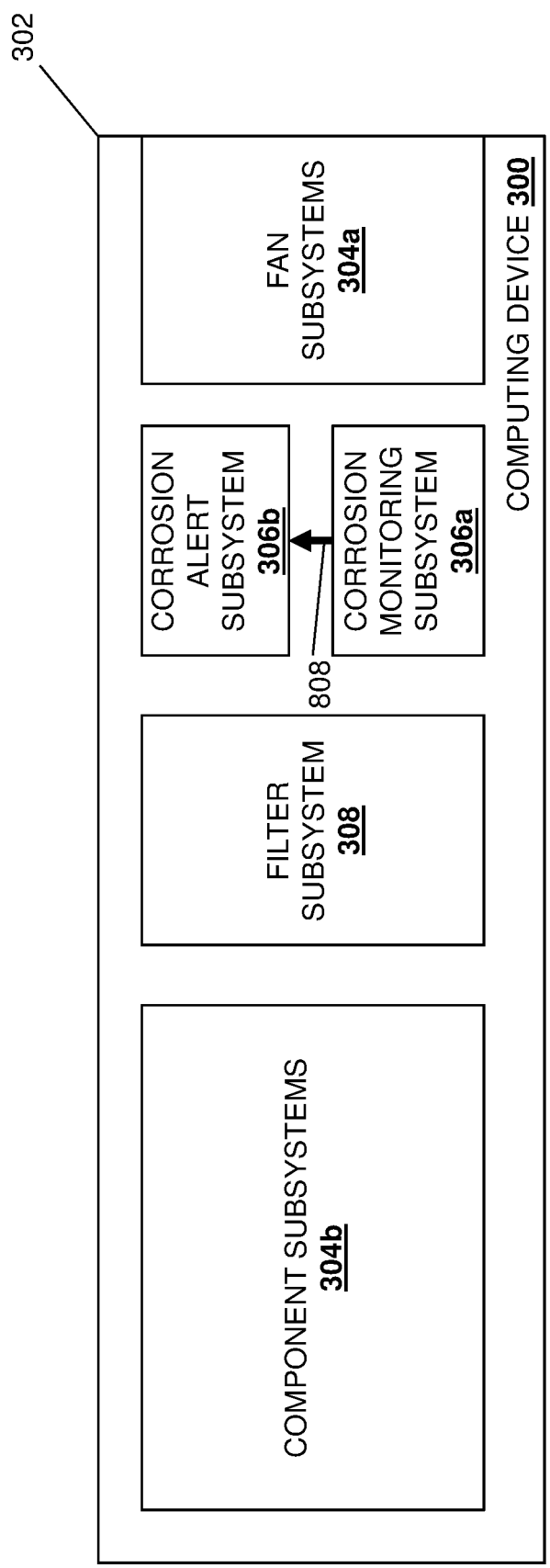
FIG. 8B is a schematic view illustrating an embodiment of the computing device of FIG. 3 operating during the method of FIG. 5.

Following the completion of any of the method blocks 502a-508a, 502b-508b, and/or 502c-508c, the method 500 may proceed to block 510 where a corrosion alert subsystem identifies corrosion alert signal(s) and/or no-corrosion alert signal(s). In an embodiment, at block 510, the corrosion alert signal(s) and/or no-corrosion alert signal(s) transmitted by the humidity monitoring subsystem 404, the temperature monitoring subsystem 406, and/or the connection corrosion test subsystem 408 may be received by the corrosion alert subsystem 306b. For example, with reference to FIG. 6B, the corrosion alert subsystem 306b may receive the corrosion alert signal(s) and/or no-corrosion alert signal(s) transmitted by the humidity monitoring subsystem 404 in the corrosion monitoring subsystem 306a/400 as part of the corrosion/no-corrosion alert signal transmission operations 606 discussed above with reference to method blocks 502a-508a. Similarly, with reference to FIG. 7B, the corrosion alert subsystem 306b may receive the corrosion alert signal(s) and/or no-corrosion alert signal(s) transmitted by the temperature monitoring subsystem 406 in the corrosion monitoring subsystem 306a/400 as part of the corrosion/no-corrosion alert signal transmission operations 706 discussed above with reference to method blocks 502b-508c. Similarly as well, with reference to FIG. 8B, the corrosion alert subsystem 306b may receive the corrosion alert signal(s) and/or no-corrosion alert signal(s) transmitted by the connection corrosion test subsystem 408 in the corrosion monitoring subsystem 306a/400 as part of the corrosion/no-corrosion alert signal transmission operations 808 discussed above with reference to method blocks 502d-508d.

The method 500 then proceeds to block 512 where the corrosion alert subsystem determines a recommended corrosion remediation action based on the corrosion alert signal(s) and/or no-corrosion alert signal(s). In an embodiment, at block 512, the corrosion alert subsystem 306b may operate to determine a recommended corrosion remediation action based on the corrosion alert signal(s) and/or no-corrosion alert signal(s) received from the humidity monitoring subsystem 404, the temperature monitoring subsystem 406, and/or the connection corrosion test subsystem 408. In a specific example, recommended corrosion remediation action may be determined based on the following table:

| HUMIDITY MONITORING SUBSYSTEM | TEMPERATURE MONITORING SUBSYSTEM | CONNECTION CORRROSION TESET SUBSYSTEM | RECOMMENDED CORROSION REMEDIATION ACTION |
|---|---|---|---|
| 1 (e.g., current humidity is greater than 90%) | 1 (e.g., current temperature is greater than 55 degrees C) | 1 (e.g., no corrosion in test wire/cable and/or connections) | Check filter subsystem and replace if necessary. |
| 1 | 0 (e.g., current temperature is less than or equal to 55 degrees C) | 1 | Condensation possible. Check filter and replace if necessary. Unplug and check redundant computing subsystems for corrosion. |
| 1 | 0 | 0 (e.g., some level of corrosion in test wire/cable and/or connections) | Power down computing device and check computing subsystem connections, power subsystems, and circuit board for corrosion. |

As such, according to the specific example provided by the table above, in a situation where the humidity monitoring subsystem 404 in the corrosion monitoring subsystem 400 identifies a current humidity that is greater than or equal to 90% humidity (e.g., by outputting a "1" to provide a corrosion alert signal as discussed above), while the temperature monitoring subsystem 406 in the corrosion monitoring subsystem 400 identifies a current temperature that is greater than 55 degrees Celsius (e.g., by outputting a "1" to provide a no-corrosion alert signal as discussed above) and the connection corrosion test subsystem 408 in the corrosion monitoring subsystem 400 identifies no corrosion in the test wire/cable 408b and or its connectors 408b and 408d (e.g., by outputting a "1" to provide a no-corrosion alert signal as discussed above), the corrosion alert subsystem 306b may identify a recommended corrosion remediation action "Check filter subsystem and replace if necessary" that instructs of user of the computing device 300 to check the filter subsystem 308 and replace filter(s) if necessary.

Similarly, according to the specific example provided by the table above, in a situation where the humidity monitoring subsystem 404 in the corrosion monitoring subsystem 400 identifies a current humidity that is greater than or equal to 90% humidity (e.g., by outputting a "1" to provide a corrosion alert signal as discussed above) and the temperature monitoring subsystem 406 in the corrosion monitoring subsystem 400 identifies a current temperature that is less than or equal to 55 degrees Celsius (e.g., by outputting a "0" to provide a corrosion alert signal as discussed above), while the connection corrosion test subsystem 408 in the corrosion monitoring subsystem 400 identifies no corrosion in the test wire/cable 408b and or its connectors 408b and 408d (e.g., by outputting a "1" to provide a no-corrosion alert signal as discussed above), the corrosion alert subsystem 306b may identify a recommended corrosion remediation action "Condensation possible. Check filter and replace if necessary. Unplug and check redundant computing subsystems for corrosion" that informs the user of the computing device 300 that current environmental conditions (e.g., current humidity and temperature) may introduce condensation in the computing device 300, and to check the filter subsystem 308 and replace filter(s) if necessary, while also removing power from redundant computing subsystems (e.g., redundant fan trays) to check for corrosion. As will be appreciated by one of skill in the art in possession of the present disclosure, the recommended corrosion remediation action for current environmental conditions (e.g., current humidity and temperature) that may introduce condensation may also include instructions to modify the computing device climate (e.g., via activation of (or increased operation of) an air conditioning system) to eliminate those environmental conditions.

Similarly, according to the specific example provided by the table above, in a situation where the humidity monitoring subsystem 404 in the corrosion monitoring subsystem 400 identifies a current humidity that is greater than or equal to 90% humidity (e.g., by outputting a "1" to provide a corrosion alert signal as discussed above), the temperature monitoring subsystem 406 in the corrosion monitoring subsystem 400 identifies a current temperature that is less than or equal to 55 degrees Celsius (e.g., by outputting a "0" to provide a corrosion alert signal as discussed above), and the connection corrosion test subsystem 408 in the corrosion monitoring subsystem 400 identifies corrosion in the test wire/cable 408b and/or its connectors 408b and 408d (e.g., by outputting a "0" to provide a corrosion alert signal as discussed above), the corrosion alert subsystem 306b may identify a recommended corrosion remediation action "Power down computing device and check computing subsystem connections, power subsystems, and circuit board for corrosion" that instructs the user of the computing device 300 to remove power from the computing device 300 and check computing subsystems (e.g., fan trays), power subsystems (e.g., power supplies), and a circuit boards for corrosion. In some examples, the recommended corrosion remediation action may instruct the user of the computing device 300 to replace all computing subsystems (e.g., fan trays) using connections similar to the test wire/cable 408b and its connectors 408b and 408d (e.g., even if those computing subsystems have not yet failed due to their likelihood of failure in such situations).

However, while three specific recommended corrosion remediation actions for respective corrosion scenarios have been described, one of skill in the art in possession of the present disclosure will appreciate how recommended corrosion remediation actions may be defined for other corrosion scenarios as well, and any of those corrosion scenarios and/or recommended corrosion remediation actions will fall within the scope of the present disclosure. As such, a computing device provider may define any of a variety of recommended corrosion remediation actions for any corrosion scenarios that have been identified in its computing devices, and those recommended corrosion remediation actions may then be determined in those corrosion scenarios as described above.

The method 500 then proceeds to block 514 where the corrosion alert subsystem transmits a recommended corrosion remediation action communication. In an embodiment, at block 514, the corrosion alert subsystem 306b may generate and transmit a recommended corrosion remediation action communication that includes any of the recommended corrosion remediation actions described above, and that recommended corrosion remediation action communication may be displayed by the device receiving that recommended corrosion remediation action communication. As such, recommended corrosion remediation action communications may be transmitted by the corrosion alert subsystem 306b to a network administrator that controls the computing device 300 in order to cause the recommended corrosion remediation action to be displayed to that network administrator, to a computing device provider that provided the computing device 300 in order to cause the recommended corrosion remediation action to be displayed to that computing device provider, and/or to any other entity that would be apparent to one of skill in the art in possession of the present disclosure. As will be appreciated by one of skill in the art in possession of the present disclosure, the network administrator, computing device provider, and/or other entity may then perform the recommended corrosion remediation action on the computing device 300 in order to remediate any corrosion situation for the computing device, or actual corrosion occurring in the computing device 300.

Thus, systems and methods have been described that provide for the monitoring for a corrosion environment in a switch device by monitoring for relatively high humidity and relatively low temperature, as well as monitoring for actual corrosion in a switch device by monitoring a test connection, which allows alerts to be generated and transmitted when the corrosion environment or actual corrosion exists. For example, the corrosion monitoring/alerting system of the present disclosure may include a switch chassis. A corrosion monitoring subsystem identifies a current humidity and a current temperature in the switch chassis, determines that the current humidity is above a corrosion-alert humidity and the current temperature is below a corrosion-alert temperature and, in response, generates a first corrosion alert signal. A corrosion alert subsystem identifies the first corrosion alert signal and, in response, transmits a first recommended corrosion remediation action communication. The corrosion monitoring subsystem may also transmit a test current through a test switch subsystem connection, determine that a test voltage generated in response to transmitting the test current through the test switch subsystem connection is below a corrosion-alert voltage and, response, generate a second corrosion alert signal. The corrosion alert subsystem may identify the second corrosion alert signal and, in response, transmit a second recommended corrosion remediation action communication. As such, corrosion environments and actual corrosion may be addressed prior to it negatively impacting the operations of the switch device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A corrosion monitoring/alerting system, comprising:
a chassis;
a corrosion monitoring subsystem that is configured to:
identify a current humidity and a current temperature in the chassis;
determine whether the current humidity is above a corrosion-alert humidity and the current temperature is below a corrosion-alert temperature; and
generate, in response to determining that the current humidity is above the corrosion-alert humidity and the current temperature is below the corrosion-alert temperature, a first corrosion alert signal; and
a corrosion alert subsystem that is coupled to the corrosion monitoring subsystem and that is configured to:
identify the first corrosion alert signal generated by the corrosion monitoring subsystem; and
transmit, in response to identifying the first corrosion alert signal, a first recommended corrosion remediation action communication.

2. The system of claim 1, wherein the corrosion monitoring subsystem is configured to:
transmit a test current through a test computing subsystem connection;
determine whether a test voltage generated in response to transmitting the test current through the test computing subsystem connection is below a corrosion-alert voltage; and
generate, in response to determining that the test voltage is below the corrosion-alert voltage, a second corrosion alert signal, and wherein the corrosion alert subsystem is configured to:
identify the second corrosion alert signal generated by the corrosion monitoring subsystem; and
transmit, in response to identifying the second corrosion alert signal, a second recommended corrosion remediation action communication.

3. The system of claim 2, wherein the second corrosion alert signal is generated in response to determining that the current humidity is above the corrosion-alert humidity, the current temperature is below the corrosion-alert temperature, and the test voltage is below the corrosion-alert voltage.

4. The system of claim 2, further comprising:
a computing subsystem that is housed in the chassis and that is associated with a computing subsystem connection that connects the computing subsystem to a circuit board that is housed in the chassis, wherein the second corrosion alert signal identifies corrosion associated with the computing subsystem connection that connects the computing subsystem to the circuit board.

5. The system of claim 2, wherein the first recommended corrosion remediation action communication includes at least one of: a filter replacement recommendation and a computing subsystem connection check recommendation, and wherein the second recommended corrosion remediation action communication includes a computing device shutdown recommendation and a computing subsystem connection check recommendation.

6. The system of claim 1, wherein the corrosion-alert humidity is 90% and the corrosion-alert temperature is 55 degrees Celsius.

7. An Information Handling System (IHS), comprising:
a processing system; and
a memory system that is coupled to the processing system and that includes instructions that, when executed by the processing system, cause the processing system to provide a corrosion monitoring engine that is configured to:
identify a current humidity and a current temperature in a chassis;
determine whether the current humidity is above a corrosion-alert humidity and the current temperature is below a corrosion-alert temperature; and
generate, in response to determining that the current humidity is above the corrosion-alert humidity and the current temperature is below the corrosion-alert temperature, a first corrosion alert signal,
wherein the memory system also includes instructions that, when executed by the processing system, cause the processing system to provide a corrosion alert engine that is configured to:
identify the first corrosion alert signal generated by the corrosion monitoring engine; and
transmit, in response to identifying the first corrosion alert signal, a first recommended corrosion remediation action communication.

8. The IHS of claim 7, wherein the corrosion monitoring engine is configured to:
transmit a test current through a test computing subsystem connection;
determine whether a test voltage generated in response to transmitting the test current through the test computing subsystem connection is below a corrosion-alert voltage; and
generate, in response to determining that the test voltage is below the corrosion-alert voltage, a second corrosion alert signal, and wherein the corrosion alert engine is configured to:
identify the second corrosion alert signal generated by the corrosion monitoring subsystem; and
transmit, in response to identifying the second corrosion alert signal, a second recommended corrosion remediation action communication.

9. The IHS of claim 8, wherein the second corrosion alert signal is generated in response to determining that the current humidity is above the corrosion-alert humidity, the current temperature is below the corrosion-alert temperature, and the test voltage is below the corrosion-alert voltage.

10. The IHS of claim 8, wherein the second corrosion alert signal identifies corrosion associated with a computing subsystem connection that connects a computing subsystem to a circuit board.

11. The IHS of claim 8, wherein the second recommended corrosion remediation action communication includes a computing device shutdown recommendation and a computing subsystem connection check recommendation.

12. The IHS of claim 7, wherein the first recommended corrosion remediation action communication includes at least one of: a filter replacement recommendation and a computing subsystem connection check recommendation.

13. The IHS of claim 7, wherein the corrosion-alert humidity is 90% and the corrosion-alert temperature is 55 degrees Celsius.

14. A method for monitoring and alerting about corrosion in a computing device, comprising:
identifying, by a corrosion monitoring subsystem, a current humidity and a current temperature in a chassis;
determining, by the corrosion monitoring subsystem, whether the current humidity is above a corrosion-alert humidity and the current temperature is below a corrosion-alert temperature;

generating, by the corrosion monitoring subsystem in response to determining that the current humidity is above the corrosion-alert humidity and the current temperature is below the corrosion-alert temperature, a first corrosion alert signal;

identifying, by a corrosion alert subsystem, the first corrosion alert signal generated by the corrosion monitoring engine; and transmitting, by the corrosion alert subsystem in response to identifying the first corrosion alert signal, a first recommended corrosion remediation action communication.

15. The method of claim 14, further comprising:

transmitting, by the corrosion monitoring subsystem, a test current through a test computing subsystem connection;

determining, by the corrosion monitoring subsystem, whether a test voltage generated in response to transmitting the test current through the test computing subsystem connection is below a corrosion-alert voltage;

generating, by the corrosion monitoring subsystem in response to determining that the test voltage is below the corrosion-alert voltage, a second corrosion alert signal;

identifying, by the corrosion alert subsystem, the second corrosion alert signal generated by the corrosion monitoring subsystem; and transmitting, by the corrosion alert subsystem in response to identifying the second corrosion alert signal, a second recommended corrosion remediation action communication.

16. The method of claim 15, wherein the second corrosion alert signal is generated in response to determining that the current humidity is above the corrosion-alert humidity, the current temperature is below the corrosion-alert temperature, and the test voltage is below the corrosion-alert voltage.

17. The method of claim 15, wherein the second corrosion alert signal identifies corrosion associated with a computing subsystem connection that connects a computing subsystem to a circuit board.

18. The method of claim 15, wherein the second recommended corrosion remediation action communication includes a computing device shutdown recommendation and a computing subsystem connection check recommendation.

19. The method of claim 14, wherein the first recommended corrosion remediation action communication includes at least one of: a filter replacement recommendation and a computing subsystem connection check recommendation.

20. The method of claim 14, wherein the corrosion-alert humidity is 90% and the corrosion-alert temperature is 55 degrees Celsius.

* * * * *